United States Patent [19]

Otsuki et al.

[11] 3,980,754

[45] Sept. 14, 1976

[54] PURIFICATION OF ALKALI CARBONATE CONTAINING A FLUORINE COMPOUND

[75] Inventors: Susumo Otsuki; Junji Arika; Mitsunobu Kashibe; Kosuke Takeshige, all of Shin-nanyo, Japan

[73] Assignee: Toyo Soda Manufacturing Co., Ltd., Japan

[22] Filed: Aug. 8, 1975

[21] Appl. No.: 603,107

[30] Foreign Application Priority Data

Nov. 16, 1974   Japan............................... 49-132224

[52] U.S. Cl. ............................ 423/185; 23/320 T; 423/421; 423/497
[51] Int. Cl.² ..................... C01B 1/28; C01D 1/32; C01D 7/26
[58] Field of Search ........... 423/185, 421, 429, 490, 423/491, 497, 163; 23/298, 302 T

[56] References Cited
UNITED STATES PATENTS

| | | | |
|---|---|---|---|
| 1,675,786 | 7/1928 | Buchner.............................. | 423/429 |
| 1,687,433 | 10/1928 | Drucker............................... | 423/185 |
| 1,776,064 | 9/1930 | Buchner.............................. | 423/429 |
| 2,914,474 | 11/1959 | Hillyer et al......................... | 423/490 |

FOREIGN PATENTS OR APPLICATIONS

| | | | |
|---|---|---|---|
| 179,755 | 2/1966 | U.S.S.R.............................. | 423/490 |
| 189,813 | 7/1966 | U.S.S.R.............................. | 423/490 |

OTHER PUBLICATIONS

Siewko et al., Chemistry, 2nd Edition, McGraw–Hill Book Co., N.Y., N.Y., 1961, p. 543.

*Primary Examiner*—Oscar R. Vertiz
*Assistant Examiner*—Gary P. Straub
*Attorney, Agent, or Firm*—Oblon, Fisher, Spivak, McClelland & Maier

[57] ABSTRACT

An alkali carbonate containing a fluorine compound is purified by dissolving the crude alkali carbonate in an aqueous solution or suspension of magnesium bicarbonate in order to transfer the fluorine impurity into the resulting colloidal flocculated precipitate whereby the fluorine is substantially separated from the aqueous solution of the alkali carbonate.

7 Claims, No Drawings

PURIFICATION OF ALKALI CARBONATE CONTAINING A FLUORINE COMPOUND

BACKGROUND OF THE INVENTION

1. Field of the Invention

The present invention relates to the purification of a crude alkali carbonate containing a fluorine compound (throughout the specification, the term "alkali carbonates" will refer to alkali carbonates, bicarbonates and sesqui-carbonates). More particularly, it relates to the purification of a crude alkali carbonate which comprises separating an impurity, especially a fluorine compound, from an alkali carbonate by a novel technique.

2. Description of the Prior Art

Alkali carbonates have been used as raw material sources of alkali for various industries including the chemical industry. Accordingly, they are required to be of high purity in order to be useful for many of the various applications. They have been produced either by synthesis or by extraction from natural alkali sources. Among the alkali carbonates, sodium carbonate, often referred to as soda ash, has been used in large amounts. It has been supplied mostly by synthetic production. However, recently, more than ten percent of the world's supply of sodium carbonate has been produced from natural soda. This trend in production from the natural soda appears to be increasing.

The natural alkali sources which have been tapped most often are trona ore, containing a main component of sodium sesquicarbonate as an underground mineral (vein); alkali crust layers containing a main component of sodium sesquicarbonate and/or sodium carbonate monohydrate, which is crystallized on alkali brine lake surfaces by natural concentration; brine; and the mineral spring water containing alkali bicarbonate. These natural sodas contain undesirable impurities in addition to their main components of alkali carbonates. The natural soda produced from volcanic zones usually contains relatively large amounts of fluorine compounds, whereby it is almost impossible to use the raw natural soda for general applications except in special cases. For example, a large amount of alkali carbonates is used as a raw material for production of pharmaceuticals and foods. The contamination by impurities, especially fluorine compounds, is hazardous and toxic for the human body. Moreover, in the glass industry, by which more than half of the soda ash produced has been consumed, the presence of a fluorine compound causes various disadvantages such as the inhibition of the production of transparent glass, damage to tanks and fusing furnaces, (i.e., the corrosion of the refractory brick of the furnace) and air pollution caused by the discharge of volatile fluorine compounds which are quite hazardous and toxic. It is also preferable to use alkali carbonates free from fluorine compounds as raw materials or additives for chemicals, inorganic compounds, detergents, paper, pulp and the like. Heretofore, it has been difficult to directly separate a fluorine compound from the alkali carbonates without changing the specific characteristics of the alkali carbonates. Thus, separation of the fluorine compounds, especially the water-soluble fluorine compounds from the alkali carbonates, has not been successfully performed on an industrial basis. Consequently, such a fluorine-removal process is sorely needed.

SUMMARY OF THE INVENTION

Accordingly, it is an object of this invention to provide a process for purification of a crude alkali carbonate wherein fluorine compounds, especially water-soluble fluorine compounds, are removed from natural soda containing fluorine compounds or from a crude alkali carbonate obtained from natural soda.

It is another object of this invention to provide a process for purification of a crude alkali carbonate which further comprises removing all reactants used for initial separation of the fluorine compounds, (e.g., magnesium salts, added by the former step).

Briefly, these and other objects of this invention, as will hereinafter be made clear by the ensuing discussion, have been attained by providing a process for purification of a crude alkali carbonate which comprises treating natural soda containing a fluorine compound or a crude alkali carbonate obtained therefrom in the presence of magnesium bicarbonate. More particularly, it comprises dissolving a solid or a suspension of a crude alkali carbonate in an aqueous solution or suspension of magnesium bicarbonate in order to transfer the fluorine impurity into the resulting colloidal flocculated precipitate whereby the fluorine impurity is substantially separated from the aqueous solution of alkali carbonate.

DETAILED DESCRIPTION OF THE PREFERRED EMBODIMENTS

In the present invention, alkali carbonate means carbonates, bicarbonates and sesquicarbonates of an alkali metal, especially sodium, and a mixture thereof.

The crude alkali carbonates used as the raw material in this invention are those which contain a fluorine compound. A typical raw material is natural soda. The natural soda or the crude alkali carbonate obtained therefrom, usually contains 0.01 – 10 wt. %, especially 0.1 – 3.0 wt. %, of the fluorine compound as F atom. The crude alkali carbonate is dissolved so as to form a concentration of from the saturation point to 5 wt. % in the presence of magnesium bicarbonate. In the preferred embodiments of this invention, the crude alkali carbonate is dissolved in water in the presence of magnesium bicarbonate in order to transfer the fluorine compound into the resulting colloidal flocculated precipitate. Then, the aqueous solution of alkali carbonate containing substantially no fluorine compound is heated, or an alkaline material is added to it, or it is heated while an alkaline material is added. Thereupon, the magnesium salt dissolved in the aqueous solution is precipitated and simultaneously the remaining fluorine compound is further transferred to the precipitate of the magnesium salt, and is separated. Suitable alkaline materials for use in the process of this invention, include the oxides and hydroxides of alkali metals, alkaline earth metals, and alkali metal silicates, aluminates and ferrites which have hydroxyl groups or which form hydroxyl groups in an aqueous solution.

In typical embodiments for dissolving the crude alkali carbonate containing fluorine compounds in the presence of magnesium bicarbonate, it is especially easy and suitable to dissolve the natural soda or the crude alkali carbonate obtained therefrom in an aqueous solution or dispersion of magnesium bicarbonate. The aqueous solution or dispersion of magnesium bicarbonate can be prepared by suspending magnesium carbonate, magnesium oxide, or magnesium hydroxide in water and feeding carbon dioxide into the solution or dispersion. For example, an aqueous solution dissolving magnesium bicarbonate at a concentration of 45 g/l of $Mg(HCO_3)_2$, i.e., 7.5 g/l of Mg, can be prepared by the above-mentioned method under 1 atm. of partial pressure of carbon dioxide gas at room temperature. It is also possible to prepare an aqueous solution of magnesium bicarbonate by dissolving a water-soluble bicarbonate such as an alkali bicarbonate, ammonium bicarbonate and the like and a water-soluble magnesium salt such as magnesium chloride, magnesium sulfate and the like, at a molar ratio of about 2:1. The aqueous solution or suspension of magnesium bicarbonate can be used for dissolving the crude alkali carbonate with or without filtration. The crude alkali carbonate containing a fluorine compound is added to the aqueous solution of magnesium bicarbonate and the mixture is stirred until the crude alkali carbonate is dissolved. The amount of magnesium bicarbonate employed is usually 0.05 – 5 wt. %, especially 0.1 – 1.0 wt. % as Mg.

When the crude alkali carbonate is added, the aqueous solution becomes cloudy and a white suspension of colloidal flocculated precipitate is formed whose nature depends upon the conditions employed. After dissolving the crude alkali carbonate, the precipitate is separated upon standing or by filtering the suspension, whereby the aqueous solution of alkali carbonate is purified by the removal of the fluorine compound. In the process of this invention, the rate of fluorine compound separation increases with increasing concentration of magnesium bicarbonate in the solution. The rate of fluorine compound separation also increases as the concentration of alkali carbonate approaches its maximum solubility in the solution. Using these maximum concentrations is also advantageous from an economical viewpoint. The stirring time should be only sufficient to dissolve the crude alkali carbonate, e.g., less than 1 hour, especially about 30 minutes. When the stirring time is too long, the fluorine compound concentrated in the colloidal flocculated precipitate gradually dissolves into the aqueous phase.

When a fluorine compound is not contained in the crude alkali carbonate, only a transparent aqueous solution is formed by dissolving the crude alkali carbonate in an aqueous solution of magnesium bicarbonate. The precipitation of the magnesium salt begins only after several hours at room temperature and the solution becomes cloudy. The white colloidal flocculated precipitate formed in the process of this invention is easily separated by filtration under reduced pressure. The separated precipitate is washed with ethanol and dried at 50°C. According to a chemical analysis of a sample obtained from crude sodium carbonate containing sodium fluoride, the following composition was present:

|  | wt. % |
|---|---|
| Na | 33.4 – 40.8 |
| Mg | 4.7 – 0.7 |
| $CO_3$ | 42.8 – 36.5 |
| F | 6.7 – 11.6 |
| dry loss (at 105°C) | 12.0 – 10.3 |

The ratio of F to Mg in the precipitate is dependent upon the magnesium concentration in the aqueous solution of magnesium bicarbonate and the fluorine compound concentration in the crude alkali carbonate.

There is no stoichiometrical relationship between Mg and F. According to X-ray diffraction of the sample of the precipitate, only crystals of NaF and $Na_2CO_3$ are present. Scattered X-rays which may be produced by an amorphous form of the precipitated magnesium salt are also found. From the above-mentioned facts, it can be understood that the white colloidal floccuated precipitate consists of water-soluble NaF, $Na_2CO_3$ and a noncrystalline magnesium salt. It is not water-insoluble $MgF_2$ or a water-insoluble double salt of NaF which is stoichiometrically formed by chemical reaction. It is not clear why the water-soluble fluorine compound is transferred and concentrated in the white colloidal flocculated precipitate. However, it may be caused by synergism between the salting-out effect, the coprecipitation of the fluorine compound, the magnesium salt adsorption (occlusion caused by chemical affinity), and the like.

In accordance with the above-mentioned process of this invention, a transparent aqueous solution of alkali carbonate which has fluorine compounds removed is obtained. The resulting purified aqueous solution can be further purified. The aqueous solution is treated by heating it, or by adding an alkaline material or by heating it while adding the alkaline material. Thereupon, the magnesium bicarbonate dissolved in the aqueous solution is converted to a water-insoluble magnesium salt and the remaining small amount of water-soluble fluorine compound is transferred and concentrated in the precipitate of the magnesium salt. The precipitate is then separated from the aqueous solution to prepare a highly purified aqueous solution of alkali carbonate. In the embodiment of the heat treatment, steam can be directly fed into the aqueous solution of alkali carbonate or the aqueous solution of alkali carbonate can be heated externally. The temperature at heating is usually in the range of 40° – 120°C, preferably 80° – 110°C. The aqueous solution becomes cloudy upon heating and a white suspended precipitate is formed. The precipitation is usually completed in 1 – 2 hours. In subsequent heat treatments, it is possible to complete the precipitation in a shorter time, such as about 30 minutes, by adding the precipitate which is formed in the previous process to the aqueous solution. The precipitate serves as seed crystals. It is possible to obtain a highly purified aqueous solution of alkali carbonate free of both the fluorine compound and the magnesium compound, by separating the precipitate upon standing or by filtering the precipitate. The white precipitate formed in the heat treatment is a crystalline material which is easily filtered. The separated precipitate is dried at 50°C. According to a chemical analysis of the sample obtained from a crude sodium carbonate containing sodium fluoride, the following composition was found:

|  | wt. % |
|---|---|
| Na | 18.0 |
| Mg | 16.4 |
| $CO_3$ | 63.2 |
| F | 0.4 |
| dry loss (at 105°C) | 1.4 |

According to X-ray diffraction, it was found that the sample has main crystalline components of $MgCO_3$ and $Na_2CO_3.MgCO_3$. From the above-mentioned facts, it can be seen that the white precipitate which is formed by the step of heat treatment comprises main components of $MgCO_3$, $NaCO_3.MgCO_3$ and $NaF$ which is adsorbed (occluded) in the crystals at their formation.

The typical embodiment of the purification of the alkali carbonate by treatment with alkaline material is as follows. The alkaline material is added to the aqueous solution of the alkali carbonate while stirring. The alkaline materials can be compounds which have hydroxyl groups or which form hydroxyl groups in an aqueous solution such as the oxides and hydroxides of alkali metals and alkaline earth metals and alkali silicates, aluminates and ferrites. The magnesium bicarbonate dissolved in the aqueous solution is neutralized by the addition of the alkaline material thereby precipitating water-insoluble magnesium compounds such as magnesium carbonate and magnesium hydroxide. When the added alkaline material is an oxide or hydroxide of an alkaline earth metal, alkali metal aluminate or alkali metal ferrite, it is customary to precipitate the corresponding carbonate of the alkaline earth metal, aluminum hydroxide or iron hydroxide, together with the precipitation of the magnesium compound. The aqueous solution of alkali carbonate containing magnesium bicarbonate has a pH which is lower than that of the pure alkali carbonate, because of the bicarbonate radicals of magnesium bicarbonate. The pH of the aqueous solution is increased by adding the alkaline material due to the decrease in the number of bicarbonate radicals. The precipitation of the magnesium compound is completed when the pH equals the pH of the pure alkali carbonate. This is the end point of the addition of the alkaline material. In this embodiment, if excess sodium hydroxide or calcium hydroxide is added to give a higher pH, the water-soluble fluorine compound adsorbed (occluded) in the precipitate during the precipitation of the magnesium compound is disadvantageously redissolved in the aqueous solution. The suspension can be treated by standing or by filtering after the formation of the precipitate. This enables separation of the precipitate, whereby an aqueous solution of purified alkali carbonate which contains substantially no fluorine compound or magnesium compound is obtained. The aqueous solution of alkali carbonate purified in accordance with the process of this invention can be condensed to produce crystals of pure alkali carbonate by precipitation (crystallization). The process of the invention is not only suitable for removing the fluorine compound from the alkali carbonate, but also for simultaneously removing other impurities such as heavy metal compounds and water-insoluble matter.

Having generally described the invention, a more complete understanding can be obtained by reference to certain specific examples, which are provided herein for purposes of illustration only and are not intended to be limiting unless otherwise specified.

REFERENCE EXAMPLE 1

Natural soda having the following components was obtained from an alkali crust layer which was formed by natural evaporation of alkali brine in Lake Natron of the United Republic of Tanzania of Africa.

|  | wt. |
|---|---|
| $NaHCO_3.Na_2CO_3.2H_2O$ | 50.15 |
| $Na_2CO_3.H_2O$ | 22.51 |
| NaCl | 5.13 |
| $Na_2SO_4$ | 2.77 |
| NaF | 1.03 |
| Water-insoluble matter | 0.52 |
| Organic matter | 0.24 |
| $H_2O$ | 17.65 |
| Total | 100.00 |
| Appearance | reddish brown |

The natural soda was crushed and washed with water and dehydrated with a centrifugal separator whereby the water-insoluble matters were removed, brine was separated and water-soluble impurities were dissolved in water to obtain the washed natural soda having the following components:

|  | wt. % |
|---|---|
| $NaHCO_3.Na_2CO_3.2H_2O$ | 71.73 |
| $Na_2CO_3.H_2O$ | 23.67 |
| NaCl | 0.50 |
| $Na_2SO_4$ | 0.37 |
| NaF | 0.94 |
| Water-insoluble matter | 0.14 |
| Organic matter | 0.07 |
| $H_2O$ | 2.58 |
| Total | 100.00 |

REFERENCE EXAMPLE 2

The washed natural soda of Reference Example 1 was calcined at 550°C for 30 minutes to remove the organic material by decomposition and combustion. At the same time, sodium sesquicarbonate and sodium carbonate monohydrate were converted to anhydrous sodium carbonate and the product was cooled to room temperature to obtain the crude soda ash having the following components.

|  | wt. % |
|---|---|
| $Na_2CO_3$ | 97.30 |
| NaCl | 0.69 |
| $Na_2SO_4$ | 0.51 |
| NaF | 1.30 |
| Water-insoluble matter | 0.20 |
| Total | 100.00 |
| Appearance | gray |

REFERENCE EXAMPLE 3

The crude soda ash were dissolved in water and water-insoluble material was filtered to obtain an aqueous solution of sodium carbonate having the following components.

|  | concentration [g/l] |
|---|---|
| $Na_2CO_3$ | 330.0 |
| NaCl | 2.34 |
| $Na_2SO_4$ | 1.73 |
| NaF | 4.41 |

REFERENCE EXAMPLE 4

The aqueous solution of sodium carbonate was heated with stirring under reduced pressure at 95° – 100°C to concentrate it and to precipitate crystals of sodium carbonate monohydrate ($Na_2CO_3 \cdot H_2O$). The suspension including monohydrate crystals was immediately filtered at 100°C under a reduced pressure to separate the crystals from the mother liquor. The crystals were washed with 20% aqueous solution of sodium carbonate at 100°C, and then the crystals were dehydrated. The amount of 20% aqueous solution of sodium carbonate used for the washing was 32.3 wt. parts to 100 wt. parts of the resulting crystals of sodium carbonate monohydrate. The dehydrated crystals of sodium formed. After stirring for 30 minutes, the aqueous suspension was filtered under reduced pressure to separate this precipitate. There was obtained an aqueous solution of sodium carbonate which was purified to remove the fluorine compound. The results are shown in Table I. (The filtration was trouble-free and the filtrate was transparent). The concentration of magnesium bicarbonate is shown as the concentration of Mg. In all following examples, the concentration will be shown in the same manner.

Table I

Rate of NaF separation (in each concentration of magnesium bicarbonate)

| | aqueous solution of magnesium bicarbonate | | temperature during dissolving operation by heat of solution | | | aqueous solution of sodium carbonate purified | | | | | | | |
|---|---|---|---|---|---|---|---|---|---|---|---|---|---|
| | Mg [g/l] | pH | Temp. [°C] | Max. temp. [°C] | Temp. in filtration [°C] | pH | Mg [g/l] | *1 T.$Na_2CO_3$ [g/l] | $Na_2CO_3$ [g/l] | Na$HCO_3$ [g/l] | NaCl [g/l] | $Na_2SO_4$ [g/l] | NaF [g/l] | NaF rate of separation (%) |
| Ref.3 | / | / | / | / | / | 11.7 | / | 330.0 | 330.0 | 0 | 2.3 | 1.7 | 4.409 | 0 |
| Exp.1 | 0.976 | 7.70 | 32.5 | 52.5 | 47 | 10.99 | 0.939 | 339.2 | 337.6 | 2.6 | 2.5 | 1.8 | 1.503 | 67.5 |
| Exp.2 | 1.997 | 7.64 | 30 | 49.5 | 43.5 | 10.70 | 1.895 | 339.1 | 337.0 | 3.3 | 2.5 | 1.8 | 1.238 | 73.4 |
| Exp.3 | 3.013 | — | 39.5 | 57 | 57 | 10.46 | 2.657 | 331.8 | — | — | 2.3 | 1.7 | 1.043 | 76.7 |
| Exp.4 | 3.204 | 7.50 | 31 | 49.5 | 44 | 10.42 | 3.012 | 338.3 | 338.3 | 0 | 2.5 | 1.8 | 0.922 | 80.0 |
| Exp.5 | 3.944 | — | 31 | 50 | 40 | — | 3.712 | 337.0 | — | — | 2.5 | 1.8 | 0.703 | 84.8 |
| Exp.6 | 4.145 | 7.46 | 30.5 | 49.5 | 46 | 10.26 | 3.836 | 334.1 | — | — | 2.5 | 1.8 | 0.681 | 85.1 |
| Exp.7 | 5.006 | 7.39 | 28 | 47 | 43 | 10.20 | 4.455 | 332.7 | 332.7 | 0 | 2.5 | 1.8 | 0.447 | 90.3 |

Note:
*1 : T.$Na_2CO_3$[g/l] = $Na_2CO_3$[g/l] + $NaHCO_3$[g/l] × 53.00/84.01 carbonate monohydrate were dried at 200°C to remove water of crystallization in order to obtain anhydrous sodium carbonate having high bulk density, referred to as dense soda ash. The recovery of sodium carbonate from the aqueous solution was 92.8% relative to the starting material including the washing solution of 20% aqueous solution of sodium carbonate. The components of the dense soda ash were as follows:

| | wt. % |
|---|---|
| $Na_2CO_3$ | 98.8 |
| NaCl | 0.061 |
| $Na_2SO_4$ | 0.045 |
| NaF | 0.939 |

EXAMPLES 1 – 7

Crude soda ash containing 1.30 wt. % of sodium fluoride of Reference Example 2 was added to each aqueous solution of magnesium bicarbonate having the concentrations shown in Table 1. It was dissolved under stirring. In all cases, the aqueous solution became cloudy upon adding the crude soda ash and a suspended white colloidal flocculated precipiate was

EXAMPLES 8 – 14

In order to highly purify the aqueous solutions of sodium carbonate of Examples 1 – 7, each aqueous solution was heated externally at about 106°C, the boiling point, under atmospheric pressure while stirring in a reactor equipped with a reflux condenser. The aqueous solution became cloudy upon heating and a suspended white precipitate was formed, preceding the boiling operation. The boiling operation was continued until completion of the precipitation. The suspension was filtered under reduced pressure to separate the precipitate and to obtain an aqueous solution of sodium carbonate which was highly purified by removal of the fluorine compound and the magnesium compound. The results are shown in Table II, wherein the rate of NaF separation is based on the content of NaF of the crude soda ash used as the raw material in Examples 1 – 7. The filtrability of the suspension was excellent and the filtrate of the aqueous solution of sodium carbonate was transparent. The addition of seed crystals in Table II refers to the addition of the crystalline precipitate formed in the previous boiling operation, which has main components of $MgCO_3$ and $Na_2CO_3 \cdot MgCO_3$, to an aqueous solution of sodium carbonate as a precipitation promoter in the following boiling operation.

Table II

High purification by boiling

| | | condition of boiling | | aqueous solution of sodium carbonate (highly purified) | | | | | | | |
|---|---|---|---|---|---|---|---|---|---|---|---|
| | Previous Examples | addition of seed crystals | Time required for completion of precipitation of magnesium salt (min.) | pH | Mg [g/l] | *1 T.$Na_2CO_3$ [g/l] | $Na_2CO_3$ [g/l] | Na$HCO_3$ [g/l] | NaCl [g/l] | $Na_2SO_4$ [g/l] | NaF [g/l] | NaF rate of Separation (%) |
| Ref.3 | / | / | / | 11.7 | / | 330.0 | 330.0 | 0 | 2.3 | 1.7 | 4.409 | 0 |
| Exp.8 | 1 | added | 35 | 10.92 | 0.004 | 335.7 | 331.5 | 6.5 | 2.5 | 1.8 | 1.470 | 68.2 |
| Exp.9 | 2 | added | 60 | 10.72 | 0.004 | 333.6 | 322.7 | 17.3 | 2.5 | 1.8 | 0.796 | 82.9 |
| Exp.10 | 3 | none | 130 | 10.45 | 0.000 | 323.4 | 311.1 | 19.5 | 2.3 | 1.7 | 0.447 | 90.0 |

Table II-continued

High purification by boiling

| | | condition of boiling | | aqueous solution of sodium carbonate (highly purified) | | | | | | | |
|---|---|---|---|---|---|---|---|---|---|---|---|
| | Previous Examples | addition of seed crystals | Time required for completion of precipitation of magnesium salt (min.) | pH | Mg [g/l] | *1 T.Na$_2$CO$_3$ [g/l] | Na$_2$CO$_3$ [g/l] | Na HCO$_3$ [g/l] | NaCl [g/l] | Na$_2$SO$_4$ [g/l] | NaF [g/l] | NaF rate of Separation (%) |
| Exp.11 | 4 | added | 40 | 10.50 | 0.003 | 335.7 | 321.2 | 22.9 | 2.5 | 1.8 | 0.380 | 91.8 |
| Exp.12 | 5 | added | 25 | 10.40 | 0.000 | 321.5 | 305.2 | 25.9 | 2.5 | 1.8 | 0.301 | 93.5 |
| Exp.13 | 6 | none | 120 | 10.33 | 0.001 | 330.5 | — | — | 2.5 | 1.8 | 0.334 | 92.7 |
| Exp.14 | 7 | added | 40 | 10.20 | 0.002 | 321.8 | 301.8 | 31.7 | 2.5 | 1.8 | 0.168 | 96.4 |

*See Table 1

In the aqueous solutions of sodium carbonate which were highly purified by the above-described processes, sodium bicarbonate, formed by reacting sodium carbonate with $CO_3^{--}$ liberated in the decomposition of magnesium bicarbonate to magnesium carbonate in the heating operation, is present. Accordingly, the pH's of the aqueous solutions were relatively low. It is possible to convert sodium bicarbonate to sodium carbonate by adding sodium hydroxide to the purified aqueous solution if desirable. Specific amounts of sodium hydroxide were added to the purified aqueous solutions of sodium carbonate obtained by the process of these Examples so as to convert sodium bicarbonate to sodium carbonate. The solutions were heated at 95° – 100°C with stirring, to condense the aqueous solution under reduced pressure and to precipitate crystals of sodium carbonate monohydrate ($Na_2CO_3 \cdot H_2O$). The condensed aqueous suspension of crystals was immediately filtered by a filter maintained at 100°C under a reduced pressure, to separate the crystals from the mother liquor. The crystals were washed with a 20% aqueous solution of sodium carbonate at 100°C and were dehydrated. The sodium carbonate monohydrate was dried at 200°C to remove the water of crystallization so as to obtain purified anhydrous sodium carbonate having a high bulk density which was pure dense soda ash. The results are shown in Table III. The amount of 20% aqueous solution of sodium carbonate used for washing is shown as its weight related to 100 wt. parts of the sodium carbonate monohydrate. The recovery of sodium carbonate is calculated relative to the amount of the starting material including the added sodium hydroxide and sodium carbonate in the aqueous washing solution of sodium carbonate.

Table III

Properties of Purified Dense Soda Ash

| | Preparation of dense soda ash | Components of purified dense soda ash | | | |
|---|---|---|---|---|---|
| | wt. parts of 20% Na$_2$CO$_3$ aq. sol. used for washing 100 wt. parts of Na$_2$CO$_3 \cdot$H$_2$O | Na$_2$CO$_3$ recovery (%) | Na$_2$CO$_3$ (%) | NaCl (%) | Na$_2$SO$_4$ (%) | NaF (%) |
| Ref.4 | 32.3 | 92.8 | 98.82 | 0.061 | 0.045 | 0.9389 |
| Exp. 8 | — | — | — | — | — | — |
| Exp. 9 | — | — | — | — | — | — |
| Exp.10 | 33.3 | 91.5 | 99.77 | 0.047 | 0.042 | 0.0116 |
| Exp.11 | 34.8 | 87.8 | 99.80 | 0.035 | 0.026 | 0.0069 |
| Exp.12 | 33.8 | 90.7 | 99.78 | 0.048 | 0.032 | 0.0057 |
| Exp.13 | 32.9 | 92.0 | 99.76 | 0.056 | 0.039 | 0.0063 |
| Exp.14 | 33.6 | 91.1 | 99.78 | 0.050 | 0.035 | 0.0026 |
| commercial dense soda ash (synthetic process) | | | 99.73 | 0.186 | 0.015 | 0.0010 |

EXAMPLES 15 – 19

In order to highly purify each already purified aqueous solution of sodium carbonate obtained by the process of Examples 1, 2, 3, 6 or 7, calcium hydroxide or milk of lime was added to the aqueous solution with stirring, whereby, bicarbonate radicals of magnesium bicarbonate were neutralized by the hydroxyl groups of the calcium hydroxide to precipitate water-insoluble magnesium and calcium carbonate. The pH was increased by the decrease of bicarbonate radicals. Each pH value was proportional to the amount of calcium hydroxide added. The suspension was filtered under reduced pressure to separate the precipitate so as to obtain aqueous solutions of sodium carbonate which were highly purified by removal of the fluorine compound and the magnesium compound. The results are shown in Table IV, wherein the rate of NaF separation is based on the NaF content of the crude soda ash used as raw material in Examples 1, 2, 3, 6 or 7. The filtering property of the suspension was excellent and the filtrate of the aqueous solution of sodium carbonate was transparent. When sodium hydroxide was used as the alkaline material in the Examples, similar results were given, though the filtrating property of the suspensions was slightly inferior to that above.

Table IV-1

High purification by addition of calcium hydroxide

| | condition | | | | aqueous solution of sodium carbonate (highly purified) | | | | | | NaF rate of separation (%) |
|---|---|---|---|---|---|---|---|---|---|---|---|
| | previous example | pH | Mg [g/l] | Ca [g/l] | *2) T.Na$_2$CO$_3$ [g/l] | Na$_2$CO$_3$ [g/l] | NaOH [g/l] | NaCl [g/l] | Na$_2$SO$_4$ [g/l] | NaF [g/l] | |
| Ref. 3 | | (11.7) | | | 330.0 | 330.0 | 0 | 2.3 | 1.7 | 4.409 | 0 |
| Exp. 15 | 1 | 12.02 | 0.000 | 0.000 | 333.2 | 329.9 | 2.5 | 2.4 | 1.7 | 1.034 | 76.7 |
| | | 11.11 | 1.300 | 0.237 | 330.9 | 330.9 | 0.0 | 2.3 | 1.7 | 0.760 | 82.8 |
| Exp. 16 | 2 | 11.56 | 0.295 | 0.029 | 323.8 | 322.9 | 0.7 | 2.3 | 1.7 | 0.340 | 92.1 |
| | | 11.68 | 0.163 | 0.000 | 320.5 | 319.7 | 0.6 | 2.3 | 1.7 | 0.336 | 92.1 |
| | | 12.13 | 0.000 | 0.000 | 318.2 | 316.3 | 1.4 | 2.3 | 1.7 | 0.397 | 90.6 |
| | | 10.90 | 2.246 | 0.103 | 331.3 | 331.3 | 0.0 | 2.3 | 1.7 | 0.484 | 89.1 |
| | | 11.04 | 1.928 | 0.207 | 325.3 | 325.3 | 0.0 | 2.3 | 1.7 | 0.371 | 91.5 |
| | | 11.24 | 0.941 | 0.077 | 322.7 | 322.7 | 0.0 | 2.3 | 1.7 | 0.161 | 96.3 |
| Exp. 17 | 3 | 11.41 | 0.498 | 0.005 | 321.7 | 321.3 | 0.3 | 2.3 | 1.7 | 0.139 | 96.8 |
| | | 11.70 | 0.058 | 0.000 | 321.4 | 320.3 | 0.8 | 2.3 | 1.7 | 0.139 | 96.8 |
| | | 12.32 | 0.000 | 0.000 | 318.5 | 315.7 | 2.1 | 2.3 | 1.7 | 0.168 | 96.1 |

Note
*2): T.Na$_2$CO$_3$[g/l] = Na$_2$CO$_3$[g/l] + NaOH [g/l] × 53.00/40.00

Table IV - 2

High purification by addition of calcium hydroxide

| | condition | | | | aqueous solution of sodium carbonate (highly purified) | | | | | | NaF rate of separation (%) |
|---|---|---|---|---|---|---|---|---|---|---|---|
| | previous example | pH | Mg [g/l] | Ca [g/l] | *2) T.Na$_2$CO$_3$ [g/l] | Na$_2$CO$_3$ [g/l] | NaOH [g/l] | NaCl [g/l] | Na$_2$SO$_4$ [g/l] | NaF [g/l] | |
| | | 10.90 | 2.260 | 0.127 | 295.1 | 295.1 | 0.0 | 2.1 | 1.5 | 0.172 | 95.6 |
| | | 11.10 | 1.463 | 0.147 | 295.0 | 295.0 | 0.0 | 2.1 | 1.5 | 0.097 | 97.5 |
| Exp. 18 | 6 | 11.19 | 0.976 | 0.008 | 293.0 | 292.3 | 0.5 | 2.1 | 1.5 | 0.069 | 98.2 |
| | | 11.36 | 0.586 | 0.006 | 291.1 | 290.2 | 0.7 | 2.1 | 1.5 | 0.062 | 98.4 |
| | | 11.48 | 0.299 | 0.000 | 288.6 | 287.7 | 0.7 | 2.0 | 1.5 | 0.083 | 97.8 |
| | | 11.61 | 0.058 | 0.000 | 283.9 | 282.7 | 0.9 | 2.0 | 1.5 | 0.086 | 97.7 |
| | | 10.50 | 3.557 | 0.226 | 333.1 | 333.1 | 0.0 | 2.4 | 1.7 | 0.181 | 95.9 |
| Exp. 19 | 7 | 10.79 | 2.994 | 0.229 | 322.2 | 322.2 | 0.0 | 2.3 | 1.7 | 0.093 | 97.8 |
| | | 11.80 | 0.062 | 0.000 | 320.2 | 319.1 | 0.8 | 2.3 | 1.7 | 0.080 | 98.1 |

EXAMPLE 20

2 Wt. parts of magnesium hydroxide were suspended in 100 wt. parts of water and $CO_2$ gas was fed into the suspension. An equal volume of water saturated with $CO_2$ was added to the suspension at 26.5°C to prepare an aqueous suspension of magnesium bicarbonate which contained 2.699 g/l of dissolved Mg component and 0.966 g/l of insoluble Mg component. The crude soda ash containing 1.30 wt. % of NaF of Reference Example 2 was added to the suspension, and was dissolved with stirring. The temperature of the system was raised to 45°C by the heat of solution. After 30 minutes, the suspended solution in which sodium carbonate was dissolved was filtered at 40°C. The purified aqueous solution of sodium carbonate having the following formula was obtained. The rate of NaF separation was 83.7%.

| pH | 10.58 | |
| T.Na$_2$CO$_3$ | 343.2 | g/l |
| NaCl | 2.5 | g/l |
| Na$_2$SO$_4$ | 1.8 | g/l |
| NaF | 0.747 | g/l |
| Mg | 3.296 | g/l |

Note *3
T.Na$_2$CO$_3$[g/l] = Na$_2$CO$_3$[g/l] + NaHCO$_3$[g/l] × $\frac{53.00}{84.01}$

EXAMPLE 21

In order to highly purify the already purified aqueous solution of sodium carbonate of Example 20, sodium aluminate was added to the aqueous solution with stirring. The resulting aqueous suspension of sodium carbonate was filtered under reduced pressure to separate the precipitate to obtain a highly purified aqueous solution of sodium carbonate having the following formula. The rate of NaF separation was 95.1% based on the NaF content of the crude soda ash used as the raw material in Example 20.

| pH | 11.72 | |
| Na$_2$CO$_3$ | 354.0 | g/l |
| NaHCO$_3$ | 0.0 | g/l |
| NaOH | 0.0 | g/l |
| NaCl | 2.5 | g/l |
| Na$_2$SO$_4$ | 1.8 | g/l |
| NaF | 0.225 | g/l |
| Mg | 0.045 | g/l |
| Al | 0.003 | g/l |

EXAMPLE 22

Natural sodium sesquicarbonate was obtained from the surface layer of the alkali crust layer which was formed on the surface of Lake Natron. The natural sodium sesquicarbonate has the following formula:

| | wt. % |
|---|---|
| NaHCO$_3$·Na$_2$CO$_3$·2H$_2$O | 91.48 |
| NaCl | 2.58 |

-continued

|  | wt. % |
|---|---|
| Na$_2$SO$_4$ | 0.97 |
| NaF | 0.35 |
| Water-insoluble matter | 0.10 |
| H$_2$O | 4.52 |
| total | 100.00 |

The natural sodium sesquicarbonate was crushed and was added to an aqueous solution of magnesium bicarbonate having a concentration of 3.020 g/l as Mg at 23.5°C. The temperature of the system was decreased to 20.0°C, because of the endothermic heat of solution. The mixture was stirred for 1 hour to dissolve the solid. The resulting aqueous suspension was filtered under reduced pressure to separate the precipitate so as to obtain a purified aqueous solution of sodium sesquicarbonate having the following formula. The rate of NaF separation was 71.0%.

|  | concentration [g/l] |
|---|---|
| NaHCO$_3$ | 54.7 |
| Na$_2$CO$_3$ | 76.9 |
| NaCl | 4.5 |
| Na$_2$SO$_4$ | 1.7 |
| Mg | 2.322 |
| NaF | 0.188 |

EXAMPLE 23

In order to highly purify the already purified aqueous solution of sodium sesquicarbonate of Example 22, the aqueous solution was externally heated at about 102°C, the boiling point, for 45 minutes under atmospheric pressure with stirring in a reactor equipped with a reflux condenser. The resulting aqueous suspension was filtered under reduced pressure to separate the precipitate so as to obtain a highly purified aqueous solution of sodium sesquicarbonate having the following formula which is purified by removal of the fluorine compound and the magnesium compound. The rate of NaF separation was 91.1% based on the NaF content of the crude sodium sesquicarbonate used as the raw material in Example 22.

|  | concentration [g/l] |
|---|---|
| NaHCO$_3$ | 55.66 |
| Na$_2$CO$_3$ | 80.02 |
| NaCl | 4.6 |
| Na$_2$SO$_4$ | 1.7 |
| Mg | 0.037 |
| NaF | 0.060 |

EXAMPLE 24

Sodium bicarbonate containing 0.52 wt. % of NaF was added to an aqueous solution of magnesium bicarbonate having a concentration of 3.031 g/l as Mg at 28°C. The temperature of the system was decreased to 24°C because of the endothermic heat of solution. The mixture was stirred for 32 minutes to dissolve the solid and the resulting aqueous suspension was filtered under reduced pressure to separate the precipitate so as to obtain a purified aqueous solution of sodium bicarbonate having the following formula. The rate of NaF separation was 35.5%.

|  | concentration [g/l] |
|---|---|
| NaHCO$_3$ | 89.3 |
| NaF | 0.314 |
| Mg | 2.918 |

EXAMPLE 25

In order to highly purify the purified aqueous solution of sodium bicarbonate of Example 24, the aqueous solution was heated to 98.5°C, and then was cooled for 30 minutes to 71.0°C. The resulting aqueous suspension was filtered under reduced pressure to separate the precipitate so as to obtain a highly purified aqueous solution of sodium bicarbonate having the following formula. The rate of NaF separation was 81.8% based on the NaF content of the raw material of sodium bicarbonate used in Example 24.

|  | concentration [g/l] |
|---|---|
| NaHCO$_3$ | 92.1 |
| NaF | 0.091 |
| Mg | 0.017 |

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for purification of an alkali carbonate containing a fluoride impurity which comprises dissolving the crude alkali carbonate in an aqueous solution or suspension of magnesium bicarbonate in order to transfer the fluoride impurity into the resulting colloidal flocculated precipitate without formation of MgF$_2$, whereby the fluoride impurity is separated from the aqueous solution of the alkali carbonate.

2. The process for purification of an alkali carbonate containing a fluoride impurity of claim 1, wherein the crude alkali carbonate is dissolved in the aqueous solution or suspension of magnesium bicarbonate so as to yield a concentration of Mg of 0.05 – 5 wt. % based on the total solution weight, and the resulting precipitate is separated from the aqueous solution of alkali carbonate.

3. The process for purification of an alkali carbonate containing a fluoride impurity of claim 1, wherein the crude alkali carbonate is dissolved in the aqueous solution or suspension of magnesium bicarbonate so as to yield a concentration of alkali carbonate of from 5 wt. % to the saturation point and the resulting precipitate is separated from the aqueous solution of alkali carbonate.

4. The process for purification of an alkali carbonate containing a fluoride impurity of claim 1, wherein the aqueous solution of alkali carbonate separated from the precipitate is heated to separate out more of the precipitate.

5. The process for purification of an alkali carbonate containing a fluorine impurity of claim 1, wherein the aqueous solution of alkali carbonate separated from the precipitate is admixed with an alkaline material which forms hydroxyl ions in an aqueous solution in order to convert magnesium bicarbonate to a water-insoluble magnesium compound, and the water-insoluble magnesium compound precipitate containing the fluoride compound is separated from the aqueous solution of alkali carbonate.

6. The process for purification of an alkali carbonate containing a fluoride impurity of claim 5, wherein the mixture of the aqueous solution of alkali carbonate with the alkaline material is heated to promote the conversion of magnesium bicarbonate to a water-insoluble magnesium compound.

7. The process for purification of an alkali carbonate containing a fluoride impurity of claim 1, wherein the alkali carbonate is natural soda or a crude alkali carbonate obtained therefrom.

\* \* \* \* \*

UNITED STATES PATENT AND TRADEMARK OFFICE
CERTIFICATE OF CORRECTION

PATENT NO. : 3,980,754
DATED : September 14, 1976
INVENTOR(S) : Susumu Otsuki et al It is certified that error appears in the above–identified patent and that said Letters Patent are hereby corrected as shown below:

Change to show the first inventor's name listed from "Susumo Otsuki" to-- Susumu Otsuki--.

Signed and Sealed this

Twenty-first Day of December 1976

[SEAL]

Attest:

RUTH C. MASON
*Attesting Officer*

C. MARSHALL DANN
*Commissioner of Patents and Trademarks*